H. F. SLOCUM.
MECHANICAL RECTIFIER FOR MAGNETOS OF AUTOMOBILES.
APPLICATION FILED JULY 16, 1917. RENEWED OCT. 28, 1920.
1,370,230.
Patented Mar. 1, 1921.
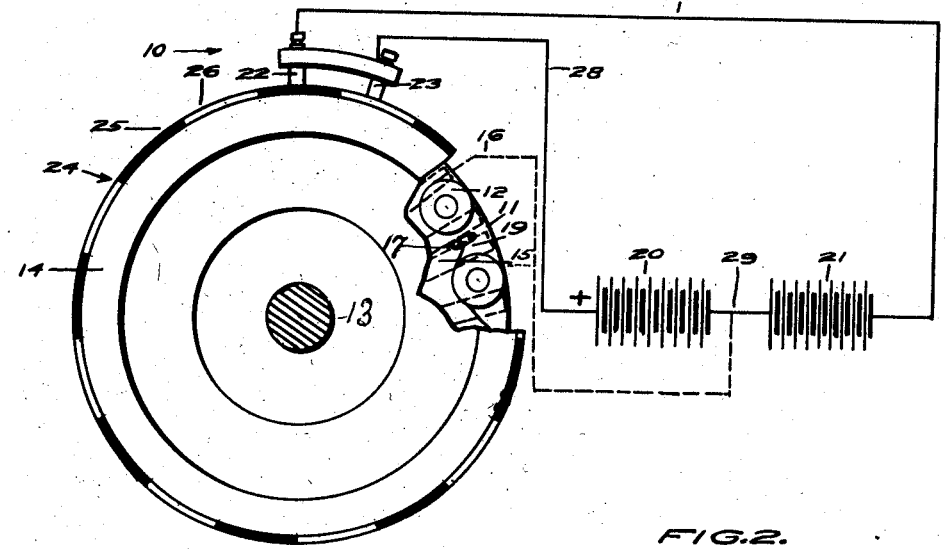
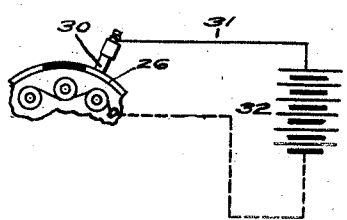
INVENTOR:
HARRY F. SLOCUM
BY Hazard & Miller
ATTYS

UNITED STATES PATENT OFFICE.

HARRY F. SLOCUM, OF SANTA ANA, CALIFORNIA.

MECHANICAL RECTIFIER FOR MAGNETOS OF AUTOMOBILES.

1,370,230.  Specification of Letters Patent.  Patented Mar. 1, 1921.

Application filed July 16, 1917, Serial No. 180,904. Renewed October 28, 1920. Serial No. 420,319.

*To all whom it may concern:*

Be it known that I, HARRY F. SLOCUM, a citizen of the United States, residing at Santa Ana, in the county of Orange and State of California, have invented new and useful Improvements in Mechanical Rectifiers for Magnetos of Automobiles, of which the following is a specification.

This invention relates to an electrical apparatus and particularly pertains to a mechanical rectifier.

It is the principal object of this invention to provide means applicable to alternating current generators to convert the current from alternating to direct, thereby permitting a constant current flow to be provided for charging batteries and other kindred purposes without the use of a motor generator set, or an expensive rectifier.

It is a further object of this invention to provide a device of the above class which may be easily applied to generators now in use and may be readily used upon the magneto of the Ford type without alteration of the parts.

Other objects will appear hereinafter.

The invention is illustrated, by way of example, in the accompanying drawings in which:

Figure 1 is a view in diagram illustrating one form of the mechanical rectifier as applied to a magneto of the movable magnet type.

Fig. 2 is a fragmentary view illustrating the brush and commutator arrangement of another type of rectifier by which an intermittent direct current may be obtained.

Referring more particularly to the drawings, 10 indicates an internal-combustion engine to the front end of which is mounted a magneto coil support 11, upon which magneto coils 12 are positioned. These coils are circumferentially disposed around the frame and concentric with the crank shaft 13 of the engine. Mounted upon the crank shaft 13 is a flywheel 14 upon the inner face of which is clamped a series of radially arranged magnets 15. It will be understood that the coils 12 are wound in series, the first coil in said series being provided with an electrical conductor 16 and the last coil with a plate 17 by which the winding is grounded upon the frame of the magneto. As the flywheel and the permanent magnets revolve over the ends of the coils 12 an alternating current will be generated. In the form of the device shown in Fig. 1 a storage battery consisting of cells 20 and 21 are charged by the magneto. For this purpose grounding brushes 22 and 23 are provided and are adapted to bear upon a commutator ring 24, preferably positioned around the outer circumference of the flywheel. This ring is formed with a series of alternately arranged metal conducting and insulating segments 25 and 26, respectively. A number of these segments corresponding to the number of magnets are incorporated within the machine. The conducting segments are grounded directly upon the flywheel and thus complete a circuit to the ground end of the magneto winding. The brushes 22 and 23 are so spaced in relation to each other than one of them will at all times be in contact with a metal conductor. These brushes are separately connected to the storage battery. The brush 22 is provided with a conductor 27 connecting with the outer binding post of the storage battery cell 21. The conductor 28 connects the brush 23 with the outer binding post of the battery 20 and the opposite side of said battery is connected to battery 21 by a conductor 29. This conductor is, in turn, connected with the magneto coil conductor 16, thus completing a two-way circuit from the conductor to the two cells 20 and 21.

In the form of the device shown in Fig. 2 a single brush 30 is used in connection with the commutator 24. A lead wire 31 connects this brush with one pole of the storage battery, while the other pole is connected by a conductor 32 to the coil winding.

In the operation of the form of the invention shown in Fig. 1, the flywheel 14 is rotated and its permanent magnets will pass by the ends of the fixed magneto coils 12. It will be understood that the continuous movement of these magnets in relation to the coils will act to generate an alternating current which in this case will pulsate at the rate of 16 alternations a revolution. Due to the arrangement of the brushes 22 and 23, one of the brushes will be in contact with one of the metal conductor segments 25 at all times. This will act, first to cause a current to pass through the ground plate 19 of the magneto and its frame, from thence through the ground to the conductor segment upon which the brush 23 is bearing. The current will then travel through the conductor 28 to the cell 20 of the battery and return to the magneto coil 12 along conductors 29 and 16. At the instant the brush 22 makes contact with the commutator plate the brush 23 passes from it. This condition will cause the current to pass from the magneto coils through the ground to the segment, thence through the brush 22 to the conductor 27, and therealong to the cell 21 of the battery, after which it will return along the conductors 29 and 16 to the winding of the coils.

The simplified form of the device shown in Fig. 2 operates similar to the form previously described. Its action will be single phased, however, as a current will be established through commutator segment 26 to the brush 30, and from thence through the cell of the battery along conductors 31 and 32 to the ground, intermittently.

It will thus be seen that by means of the simple expedients here provided direct current may be drawn from an alternating current machine.

While I have shown the preferred form of my mechanical rectifier as now known to me, it will be understood that various changes in the combination, construction and arrangement of parts may be made by those skilled in the art without departing from the spirit of my invention.

I claim:

In a mechanical rectifier for the magnetos of automobiles, the combination with a fly wheel, of permanent magnets carried by said fly wheel, an annular series of connected magneto coils disposed adjacent to the path of travel of said magnets, a commutator ring mounted on said fly wheel, the sections of which commutator are grounded on said fly wheel, a storage battery and means for taking a current from the commutator ring and delivering said current to said storage battery.

In testimony whereof I have signed my name to this specification.

HARRY F. SLOCUM.